US010138889B2

United States Patent
Yano et al.

(10) Patent No.: US 10,138,889 B2
(45) Date of Patent: Nov. 27, 2018

(54) OIL-FREE SCREW COMPRESSOR (71) Applicant: KOBE STEEL, LTD., Kobe-shi (JP)

(72) Inventors: Yoshio Yano, Kako-gun (JP); Toshiyuki Miyatake, Kako-gun (JP)

(73) Assignee: Kobe Steel, Ltd., Kobe-shi (JP)

(*) Notice: Subject to any disclaimer, the term of this patent is extended or adjusted under 35 U.S.C. 154(b) by 37 days.

(21) Appl. No.: 15/124,596

(22) PCT Filed: Dec. 11, 2014

(86) PCT No.: PCT/JP2014/082812
§ 371 (c)(1),
(2) Date: Sep. 8, 2016

(87) PCT Pub. No.: WO2015/136803
PCT Pub. Date: Sep. 17, 2015

(65) Prior Publication Data
US 2017/0016446 A1 Jan. 19, 2017

(30) Foreign Application Priority Data
Mar. 10, 2014 (JP) ................................. 2014-046598

(51) Int. Cl.
F01C 19/00 (2006.01)
F04C 18/00 (2006.01)
(Continued)

(52) U.S. Cl.
CPC ............ F04C 27/009 (2013.01); F01C 21/02 (2013.01); F04C 18/16 (2013.01); F04C 27/02 (2013.01);
(Continued)

(58) Field of Classification Search
CPC ........ F04C 18/16; F04C 27/02; F04C 27/007; F04C 29/12; F04C 2240/20;
(Continued)

(56) References Cited

U.S. PATENT DOCUMENTS 4,487,563 A * 12/1984 Mori ..................... F04C 27/009
418/104
4,770,615 A * 9/1988 Fujiwara ................. F04C 18/16
418/201.1
(Continued)

FOREIGN PATENT DOCUMENTS

BE 1010821 A3 2/1999
JP 50-354 U 1/1975
(Continued)

OTHER PUBLICATIONS

International Preliminary Report on Patentability and Written Opinion dated Sep. 22, 2016 in PCT/JP2014/082812 (with English language translation).
(Continued)

Primary Examiner — Theresa Trieu
(74) Attorney, Agent, or Firm — Oblon, McClelland, Maier & Neustadt, L.L.P.

(57) ABSTRACT

An oil-free screw compressor with good assemblability of a shaft seal device that reduces leakage of a compressed gas, where the oil-free screw compressor accommodates male and female screw rotors in a rotor chamber of a casing, supports each screw rotor by a bearing through a rotor shaft, and has shaft seal devices in a shaft seal space. The shaft seal devices include an oil seal on the side of the bearing, a packing case on the side of the rotor chamber, and a gas seal. An end of the packing case on the side of the bearing and an end of the oil seal on the side of the rotor chamber are fitted and fixed by interference fit to form a gas seal accommodation space, the gas seal accommodation space accommodating the seal ring.

9 Claims, 7 Drawing Sheets (51) Int. Cl.
*F04C 27/00* (2006.01)
*F16J 15/00* (2006.01)
*F04C 18/16* (2006.01)
*F01C 21/02* (2006.01)
*F04C 27/02* (2006.01)
*F16J 15/34* (2006.01)
*F04C 29/12* (2006.01)

(52) U.S. Cl.
CPC ............ *F04C 29/12* (2013.01); *F16J 15/3484* (2013.01); *F04C 2240/20* (2013.01); *F04C 2240/30* (2013.01); *F04C 2240/50* (2013.01)

(58) Field of Classification Search
CPC .............. F04C 2240/30; F04C 2240/50; F04C 2230/602; F01C 19/125; F01C 21/02; F16J 15/3256; F16J 15/3484; F16J 15/40; F01D 11/02
USPC ................. 418/97–99, 102, 104, 141, 201.1; 277/351, 412, 431, 432, 927
See application file for complete search history.

(56) References Cited

U.S. PATENT DOCUMENTS

| | | | | |
|---|---|---|---|---|
| 4,781,553 A | * | 11/1988 | Nomura | ................ F04C 27/009 418/104 |
| 6,287,088 B1 | * | 9/2001 | Nishimura | .............. F04C 18/16 418/201.1 |
| 8,435,020 B2 | * | 5/2013 | Amano | ................... F04C 18/16 418/201.1 |
| 2002/0044876 A1 | * | 4/2002 | Yoshimura | .............. F01C 21/02 417/410.4 |
| 2008/0240963 A1 | * | 10/2008 | Kimura | ................. F04C 27/009 418/104 |
| 2008/0240964 A1 | | 10/2008 | Kimura et al. | |
| 2010/0253005 A1 | * | 10/2010 | Liarakos | .............. F16J 15/3526 277/353 |
| 2012/0112421 A1 | | 5/2012 | Sato | |
| 2013/0075975 A1 | * | 3/2013 | Hilaris | ..................... F16J 15/40 277/350 |

FOREIGN PATENT DOCUMENTS

| | | |
|---|---|---|
| JP | 61-144289 U | 9/1986 |
| JP | 61-179460 U | 11/1986 |
| JP | 1-77169 U | 5/1989 |
| JP | 2-66762 U | 5/1990 |
| JP | 2-124289 U | 10/1990 |
| JP | 2008-255796 A | 10/2008 |
| JP | 2011-256828 A | 12/2011 |
| WO | 2012/001829 A1 | 1/2012 |

OTHER PUBLICATIONS

International Search Report dated Mar. 10, 2015 in PCT/JP2014/82812 Filed Dec. 11, 2014.

* cited by examiner

OIL-FREE SCREW COMPRESSOR

CROSS-REFERENCE TO RELATED APPLICATIONS

This is a national phase application in the United States of International Patent Application No. PCT/JP2014/082812 with an international filing date of Dec. 11, 2014, which claims priority of Japanese Patent Application No. 2014-046598 filed on Mar. 10, 2014, the entire contents of which are incorporated herein by reference.

TECHNICAL FIELD

The present invention relates to an oil-free screw compressor. More specifically, the present invention relates to a shaft seal device of an oil-free screw compressor.

BACKGROUND ART

Since an oil-free screw compressor does not supply oil into the rotor chamber, the oil-free screw compressor is more likely to leak a compressed gas than an oil supply type screw compressor. This leakage of the compressed gas easily affects the compressor performance. Thus, a shaft seal device (a gas seal) used to prevent the compressed gas from leaking from the area between the rotor shaft and the casing.

The oil-free screw compressor supplies lubricating oil to the bearing that supports the rotor shaft and the gear mechanism that transmits the rotational drive force from the drive source to the rotor shaft. When the rotor chamber has a negative pressure during unload operation, the lubricating oil supplied to the bearing and the like can flow into the rotor chamber. Thus, a shaft seal device (an oil seal) is used to prevent the lubricating oil supplied to the bearing and the like from flowing into the rotor chamber.

An oil-free compressor having the shaft seal device (the gas seal and the oil seal) is disclosed in e.g., Japanese Utility Model Application Laid-Open (JP-U) No. 61-144289.

SUMMARY OF THE INVENTION

Problems to be Solved by the Invention

In the oil-free screw compressor disclosed in Japanese Utility Model Application Laid-Open (JP-U) No. 61-144289, the shaft seal device separately includes a first shaft seal device having a seal ring and a spacer, and a second shaft seal device having a labyrinth on its inner side. Since the first shaft seal device and the second shaft seal device are separated to be assembled, the number of assembling steps is increased to make the assemblability poor. In addition, the first shaft seal device and the second shaft seal device come into contact with each other on the side end faces thereof in the direction perpendicular to the axes thereof. When the rotor shaft warps, a gap is caused between the side end faces in contact with each other to be likely to leak a compressed gas from the gap.

Therefore, to solve the technical problems, an object of the present invention is to provide an oil-free screw compressor that has good assemblability of a shaft seal device and reduces leakage of a compressed gas from the shaft seal device.

Means for Solving the Problems

To solve the technical problems, the present invention provides the following oil-free screw compressor.

That is, the present invention provides an oil-free screw compressor that accommodates a pair of male and female screw rotors intermeshing with each other in a rotor chamber of a casing in the compressor, supports each screw rotor by a bearing through a rotor shaft, and has a shaft seal device disposed in a shaft seal space of the casing formed between the rotor chamber and the bearing to seal the rotor shaft, in which the shaft seal device includes an oil seal disposed on the side of the bearing, a packing case disposed on the side of the rotor chamber, and a gas seal sealing a gas, in which an end of the packing case on the side of the bearing and an end of the oil seal on the side of the rotor chamber are fitted and fixed by interference fit to form a gas seal accommodation space, the gas seal accommodation space accommodating the gas seal.

With the above configuration, the packing case and the oil seal of the shaft seal device are fitted, fixed, and integrated by interference fit. The packing case and the oil seal of the shaft seal device are integrated to form the gas seal accommodation space, which accommodates the gas seal. This makes the assemblability of the shaft seal device good. The gap caused by interference fit is very small. This can reduce leakage of a compressed gas from the fitted and fixed portion.

The "fitted and fixed by interference fit" herein means a wide concept including, in addition to interference fit (JIS B 0401) that makes the dimension of a fit convex end larger than the dimension of a fit concave end in the radial direction to give interference, transition fit (JIS B 0401) that gives slight interference to enable relatively easy disassembling.

MODE FOR CARRYING OUT THE INVENTION

Figure 1:
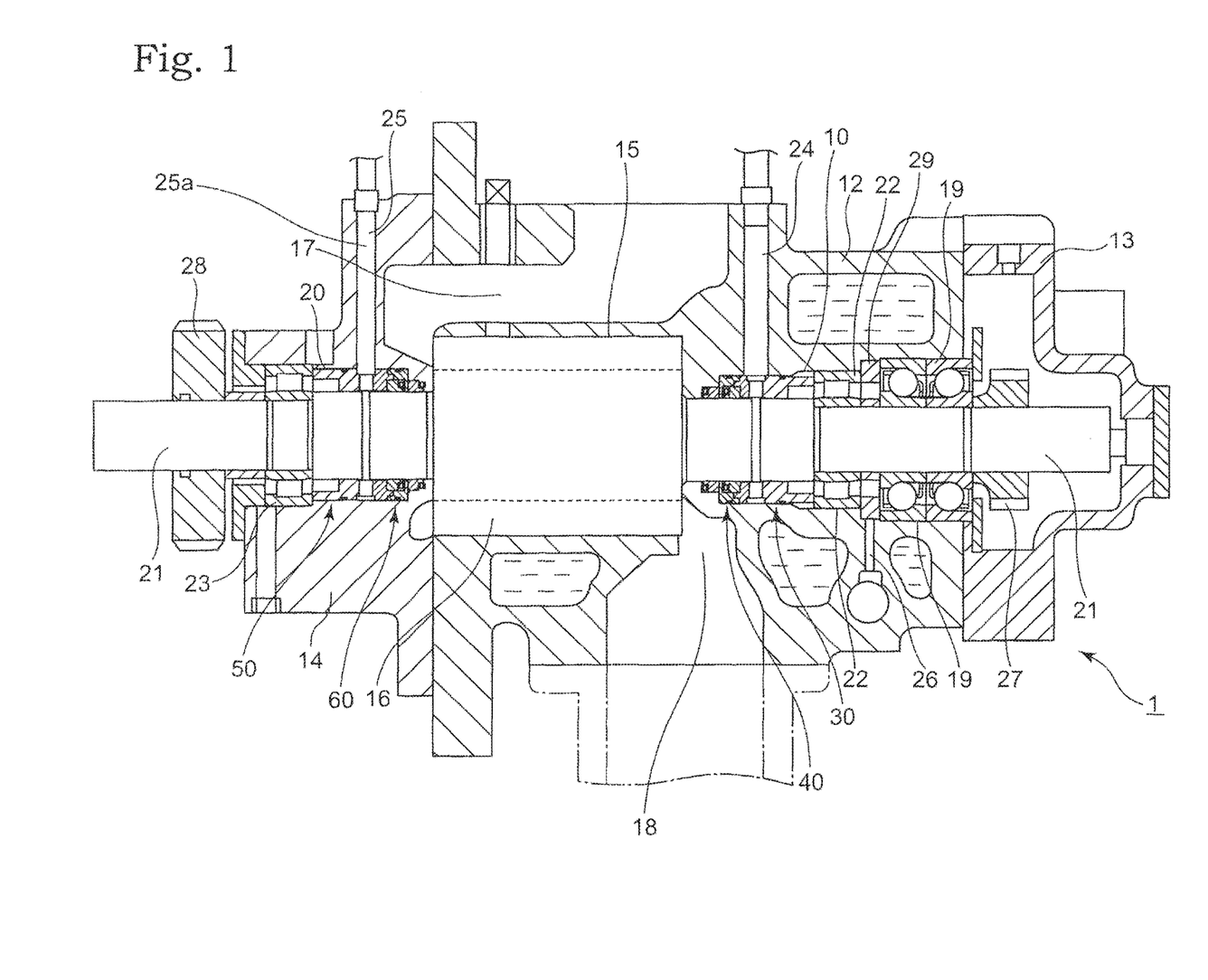
FIG. 1 is a longitudinal cross-sectional view of the main body of an oil-free screw compressor according to the present invention.

An oil-free screw compressor 1 according to an embodiment of the present invention will be described in detail with reference to FIG. 1.

The oil-free screw compressor 1 has a casing including a casing body 12, a discharge side casing 13, and a suction side casing 14. The oil-free screw compressor 1 compresses a targeted gas by a pair of male and female screw rotors 16 intermeshing with each other and accommodated in a rotor chamber 15 of the casing.

The casing body 12 has a suction port 17 that supplies the gas to be compressed into the rotor chamber 15, and a discharge port 18 that discharges the gas compressed by the screw rotors 16 in the rotor chamber 15. The discharge side casing 13 is mounted on the casing body 12 at the discharge side. The suction side casing 14 is mounted on the casing body 12 at the suction side. At the discharge side end and the suction side end of the screw rotors 16, rotor shafts 21 are provided. At the end of the suction side rotor shaft 21, a drive gear 28 is mounted. At the end of the discharge side rotor shaft 21, a timing gear 27 is mounted. The rotational drive force of a motor, not illustrated, is transmitted to one of the screw rotors 16 through the drive gear 28. The rotational drive force transmitted to the one screw rotor 16 is transmitted to the other screw rotor 16 through the timing gear 27. The pair of screw rotors 16 engages with each other in a non-contact state to rotate. The gas suctioned from the suction port 17 is compressed to a predetermined pressure, and is then discharged from the discharge port 18.

On the discharge side of the casing body 12, a discharge side shaft seal space 10 is formed. The discharge side shaft seal space 10 is used for assembling a ball bearing (a two-row angular contact ball bearing) 19 and a discharge side bearing (a roller bearing) 22, which rotatably support the discharge side rotor shaft 21, and discharge side shaft seal devices 30, 40 that shaft-seal the discharge side rotor shaft 21. On the suction side casing 14, a suction side shaft seal space 20 is formed. The suction side shaft seal space 20 is used for assembling a suction side bearing (a roller bearing) 23 that rotatably supports the suction side rotor shaft 21, and suction side shaft seal devices 50, 60 that shaft-seal the suction side rotor shaft 21.

The casing body 12 has a first atmosphere communication hole 24a. The first atmosphere communication hole 24a communicates the outside (the atmosphere side) of the casing body 12 and the discharge side shaft seal space 10. The suction side casing 14 has a first atmosphere opening communication hole 25a. The first atmosphere opening communication hole 25a communicates the outside (the atmosphere side) of the suction side casing 14 and the suction side shaft seal space 20. The casing body 12 also has an oil supply hole 26. The oil supply hole 26 is used for supplying lubricating oil to the bearings 19, 22, and 23 and the timing gear 28.

The discharge side shaft seal devices 30, 40 disposed in the discharge side shaft seal space 10 and the suction side shaft seal devices 50, 60 disposed in the suction side shaft seal space 20 are substantially symmetric with respect to the rotor chamber 15 in the axis direction. Thus, the discharge side shaft seal devices 30, 40 will be described with reference to the drawings.

Figure 2:
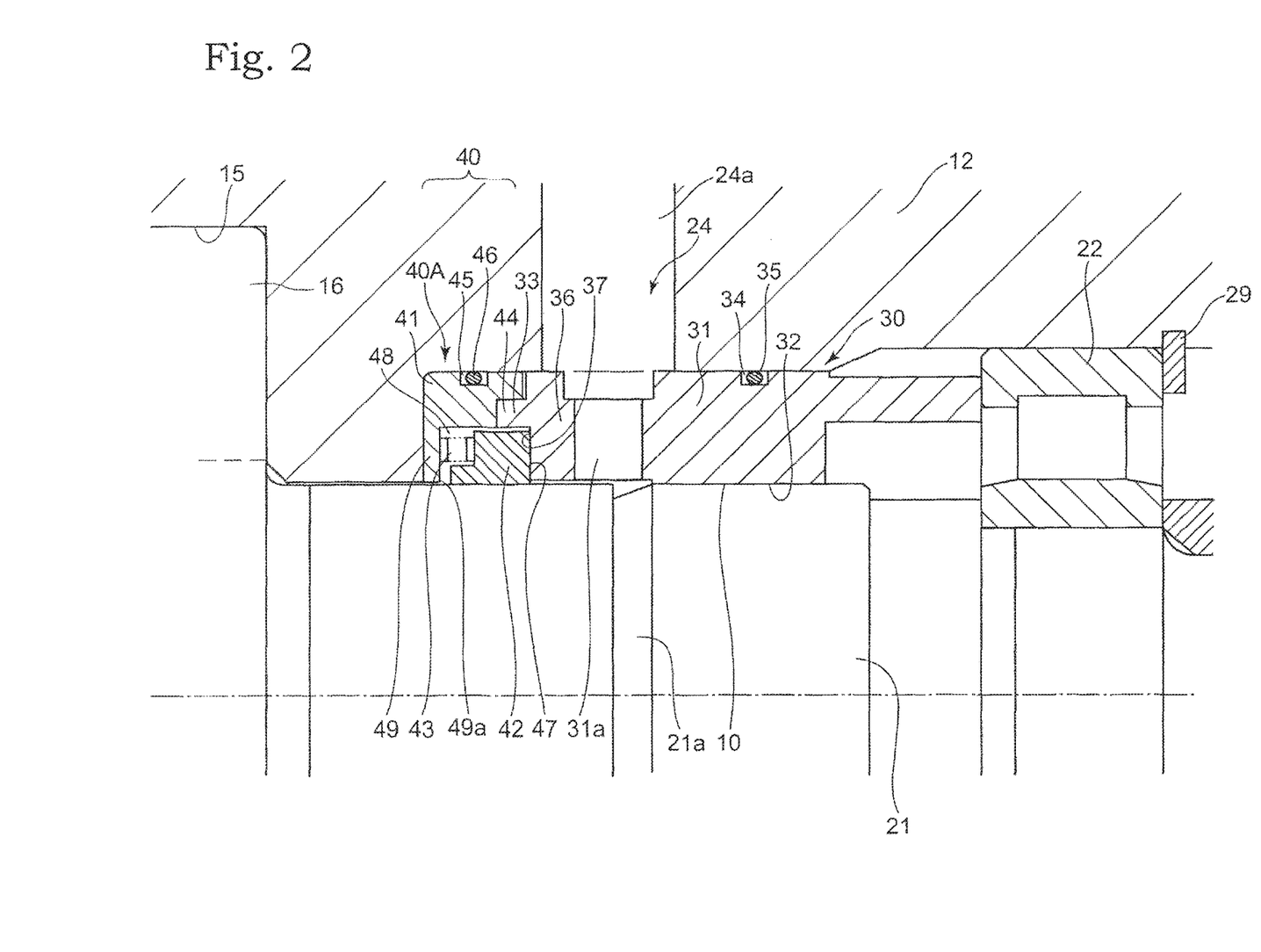
FIG. 2 is a partial cross-sectional view illustrating a first embodiment of the present invention.

FIG. 2 is a partial cross-sectional view illustrating the discharge side shaft seal devices 30, 40 according to the first embodiment.

In the discharge side shaft seal space 10, the discharge side bearing 22, the discharge side shaft seal device 30 that seals the rotor shaft 21 against, oil, and the discharge side shaft seal device 40 that seals the rotor shaft 21 against a compressed gas are disposed in this sequence over the area from the side of the discharge side bearing 22 to the side of the rotor chamber 15. The end of the discharge side bearing 22 inserted into the discharge side shaft seal space 10 on the opposite side of the rotor chamber 15 is restricted by a stopper 29. The discharge side shaft seal devices 30, 40 configure a shaft seal device that is coupled and integrated by a later-described fit configuration.

The discharge side shaft seal device 30 is disposed in the shaft seal space 10 on the side of the discharge side bearing 22, and is e.g., a non-contact oil seal 31 having a labyrinth 32 as an oil seal portion on its inner face. The labyrinth 32 is not illustrated. Since the oil seal 31 has a groove like the labyrinth 32 on its inner face, the oil seal is made of a metal material that is easy to cut. At an end 36 of the oil seal 31 on the side of the rotor chamber 15, a fit convex end 33 is formed. The fit convex end 33 has a tubular outer peripheral face projecting toward the rotor chamber 15. As described later, the fit convex end 33 fits to a fit concave end 44 of a packing case 41. On the side face at the end 36 of the oil seal 31 on the side of the rotor chamber 15, a seal face 37 is formed. The seal face 37 extends perpendicularly to the rotor shaft 21. Preferably, at the end 36 of the oil seal 31 on the side of the rotor shaft 21, a tubular space is formed, so that the seal face 37 is formed on the side face of the tubular space at the side of the rotor chamber 15. Since a part of a later-described gas seal accommodation space 48 is provided on the side of the oil seal 31, the length of the shaft seal device can be shorten. Thus, the seal face 37 is desirably formed on the side face of the tubular space at the side of the rotor chamber 15 in the oil seal 31.

The discharge side shaft seal device 40 is a first gas seal 40A disposed at the area closer to the rotor chamber 15 than the discharge side shaft seal device 30. The first gas seal 40A has the packing case 41, a seal ring 42, and a resilient body 43. The resilient body 43 is a metal member that generates, during use, a resilient force pressing and supporting the seal ring 42 onto a seal face 37, that is, a wave spring, a wave washer, a helical compression spring or the like. In particular, the wave spring or the wave washer made by processing a thin steel plate in an annular or wavy shape is preferable because the wave spring or the wave washer can decrease the height (thickness) and the disposing space. The packing case 41 is made of a hard material, such as a stainless steel. Preferably, the packing case 41 is made of a material harder than the material of the oil seal 31. At the end of the packing case 41 on the side of the discharge side bearing 22, the fit concave end 44 is formed. The fit concave end 44 has a tubular inner peripheral face that fits to the fit convex end 33 of the oil seal 31 having a tubular outer peripheral face. Thus, the oil seal 31 and the first gas seal 40A are coupled by the fit configuration including the fit convex end 33 and the fit concave end 44 to integrate the discharge side shaft seal devices 30, 40.

In the fit configuration illustrated in FIG. 2, the fit contact face (the tubular outer peripheral face) of the fit convex end 33 made of a relatively soft material directs radially outward, and the fit contact face (the tubular inner peripheral face) of the fit concave end 44 made of a relatively hard material directs radially inward. Thus, even if the soft oil seal 31 is shaven by the hard packing case 41 in the fitting assembling process, foreign substances (chips) can be prevented from intruding into the first gas seal 40A.

When the fit configuration is reversed so that the oil seal 31 has the fit concave end and that the packing case 41 has the fit convex end, the fit contact face (the tubular inner peripheral face) of the oil seal 31 with respect to the packing case 41 is located to direct radially inward. When the relatively soft oil seal 31 is shaven by the relatively hard packing case 41 in the fitting process, foreign substances can intrude into the first gas seal 40A. From the viewpoint of the processability and the foreign substances intrusion prevention, the fit configuration illustrated in FIG. 2 is preferable, but the fit configuration illustrated in FIG. 2 may be reversed. In addition, the oil seal 31 and the packing case 41 may be made of the same material (e.g., a stainless steel).

The fit configuration including the fit concave end 44 and the fit convex end 33 may be formed by transition fit that gives slight interference to enable relatively easy disassembling, in addition to interference fit that makes the dimension of the tubular outer peripheral face (the outer diameter) of the fit convex end 33 larger than the tubular inner peripheral face (the inner diameter) of the fit concave end 44 to give interference and then strongly fixes the packing case 41 and the oil seal 31 by press fit, shrink fit, and freeze fit. In either case, a gap between the fit concave end 44 and the fit convex end 33 is very small and is substantially absent. This can prevent a compressed gas from leaking from the gap.

At the end of the packing case 41 on the side of the rotor chamber 15, a projection 49 is formed. The projection 49 projects radially inward. On the side face of the projection 49 at the side of the discharge side bearing 22, a support face 49a is formed. The support face 49a extends perpendicularly to the axial direction of the rotor shaft 21. Between the end 36 of the oil seal 31 and the projection 49 of the packing case 41, the gas seal accommodation space 48 is formed. In other words, the end of the packing case 41 on the side of the bearing (the fit concave end 44) and the end of the oil seal 31 on the side of the rotor chamber 15 (the fit convex end 33) are fit and fixed to form the tubular gas seal accommodation space 48. The gas seal accommodation space 48 faces the outer peripheral face of the rotor shaft 21. Both ends of the gas seal accommodation space 48 in the axial direction are defined by the seal face 37 of the oil seal 31 and the support face 49a of the packing case 41. The seal ring 42 and the wave spring 43 are sandwiched between the seal face 37 and the support face 49a.

The seal ring 42 has an inner diameter that is slightly larger than the outer diameter of the rotor shaft 21. For example, the seal ring 42 is made by using, as a base material, the same material as the rotor shaft 21 (e.g., a stainless steel), and then by coating a film having a low friction coefficient on the surface of the base material. The wave spring 43 compressed in the axial direction has one end abutting onto the seal ring 42 and the other end abutting onto the support face 49a, so that its resilient force presses the seal ring 42 onto the seal face 37. The seal ring 42 has a seal face 47 pressed into contact with the seal face 37 of the end 36 by the wave spring 43. Thus, in the gas seal accommodation space 48, the seal ring 42 is pressed toward the end 36 of the oil seal 31 (the seal face 37) and is resiliently supported by the resilient force of the wave spring 43.

With the above configuration, the seal ring 42 can move in the radial direction along the seal face 37. Thus, even if the rotor shaft 21 warps to be eccentric with respect to the seal ring 42, the seal ring 42 follows the rotor shaft 21 to move in the radial direction. With such a configuration, the seal ring 42 and the rotor shaft 21 can be prevented from being worn and broken, and a gap between the seal ring 42 and the rotor shaft 21 can be prevented from being widened to maintain the shaft sealing performance.

In the seal ring configuration of the discharge side shaft seal device 40, the seal ring 42 that comes into close contact with the seal face 37 of the oil seal 31 is disposed with a very small gap between the seal ring 42 and the outer peripheral face of the rotor shaft 21. In the seal ring configuration, a compressed gas that passes through the slight gap between the seal ring 42 and the rotor shaft 21 is made to cause pressure loss. It is thus possible to exhibit the shaft sealing performance that prevents the compressed gas from leaking.

To assemble the integrated discharge side shaft seal devices 30, 40 detachably to the discharge side shaft seal space 10, a clearance slightly larger than loose fit (JIS B 0401) is provided between the casing body 12 (the casing) and the discharge side shaft seal devices 30, 40. Since the provided clearance sacrifices the gas sealing performance, an O-ring 35 is disposed between the oil seal 31 and the casing body 12 (the casing), and an O-ring 46 is disposed between the packing case 41 and the casing body 12 (the casing). Needless to say, the dimension of the clearance is set in the range that can exhibit the sealing function of the O-rings 35, 46. Preferably, the O-ring 35 is disposed in a concave portion (annular groove) 34 formed along the peripheral direction on the outer peripheral face of the oil seal 31, and the O-ring 46 is disposed in a concave portion (annular groove) 45 formed along the peripheral direction on the outer peripheral face of the packing case 41. The O-ring 35 of the oil seal 30 and the O-ring 46 of the packing case 41 can prevent useless gas flow, such as leakage of a compressed gas, between the casing body 12 and the discharge side shaft seal devices 30, 40.

The casing body 12 (the casing) has at least one first atmosphere communication hole 24a at the area closer to the bearing 22 than the position at which the O-ring 46 is disposed. The first atmosphere communication hole 24a extends through the casing to communicate the shaft seal space 10 and the outside (the atmosphere side) of the casing. The oil seal 30 (the discharge side shaft seal device) has a plurality of oil seal atmosphere communication holes 31a that extend therethrough. The plurality of oil seal atmosphere communication holes 31a communicate with the first atmosphere communication hole 24a through an annular groove provided on the outer periphery of the oil seal 30 having a width wider than the hole diameter of the oil seal atmosphere communication holes 31a. In addition, the plurality of oil seal atmosphere communication holes 31a are formed so as to communicate with the position at which the gas seal accommodation space 48 in the shaft seal space 10 and the labyrinth 32 (the oil seal portion) provided in the oil seal 30 are connected on the inner peripheral side of the oil seal 30. Thus, the first atmosphere communication hole 24a, the oil seal atmosphere communication holes 31a, and the annular groove connecting both configure a first atmosphere opening passage 24. With the larger opening diameter, the first atmosphere communication hole 24a can be easily formed and processed, and the pressure loss can be reduced. This allows the pressure of the shaft seal space 10 in which the oil seal atmosphere communication holes 31a are located, to be close to the atmospheric pressure. Thus, in an axial space formed between the O-ring 35 and the O-ring 46, the opening diameter of the first atmosphere communication hole 24a is preferably as large as possible.

On the rotor shaft 21 at the downstream side (side of the oil seal atmosphere communication holes 31a) of the labyrinth 32 (the oil seal portion), an oil return groove 21a is formed. The oil return groove 21a has a diameter which is tapered toward the rotor chamber 15. In the oil return groove 21a, even if lubricating oil in the discharge side bearing 22 flows along the rotor shaft 21 to leak into the oil return groove 21a, a centrifugal force acts on the lubricating oil, which can be returned to the upstream side.

The first atmosphere opening passage 24, which communicates the outside of the casing body 12 and the shaft seal space 10 corresponding to the discharge side shaft seal device (the oil seal) 30, opens the shaft seal space 10 corresponding to the discharge side shaft seal device (the oil seal) 30 into the atmosphere. Thus, even if the rotor chamber 15 has a negative pressure therein during unload operation to exert a force suctioning oil in the discharge side bearing 22 into the rotor chamber 15, the first atmosphere opening passage 24 opened into the atmosphere prevents the oil in the discharge side bearing 22 from being suctioned into the rotor chamber 15.

The gap between the fit concave end 44 and the fit convex end 33 in the radial direction is much smaller than the gap between the seal ring 42 and the rotor shaft 21 and than the clearance between the packing case 41 and the casing body 12, and this gap is substantially absent. That is, by interference fit, the gap between the fit concave end 44 and the fit convex end 33 can be substantially prevented from being affected by warp of the rotor shaft 21. It is thus possible to prevent a compressed gas from leaking from the gap. In addition, the clearance between the packing case 41 and the casing body 12 is sealed by the O-ring 46. It is thus possible to prevent a compressed gas from leaking from the gap. Further, the packing case 41 and the oil seal 30 are integrated by interference fit to form the gas seal accommodation space 48. This can appropriately maintain the closely-contacted state between the seal face 37 of the oil seal 31 and the seal face 47 of the seal ring 42 pressed toward the seal face 37, without being affected by warp of the rotor shaft 21. It is thus possible to significantly reduce leakage of a compressed gas in the entire discharge side shaft seal device 40.

Figure 3:
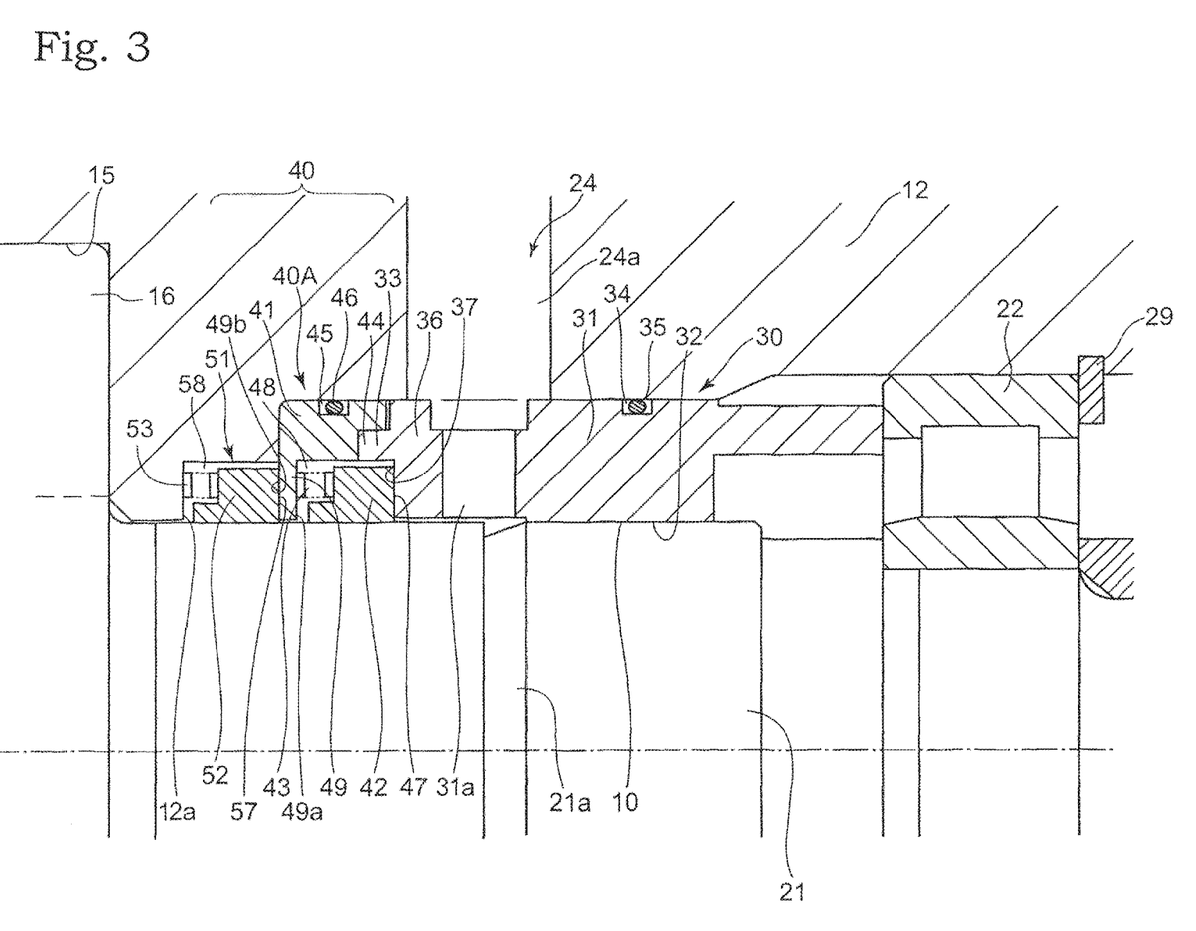
FIG. 3 is a partial cross-sectional view illustrating a second embodiment of the present invention.

A second embodiment of the present invention will be described in detail with reference to FIG. 3. The components of the second embodiment having the same function as the components of the first embodiment are indicated by the same reference numerals, and the overlapped description is omitted.

The discharge side shaft seal device 40 has a second gas seal 51 in addition to the first gas seal 40A described in the first embodiment. The second gas seal 51 is disposed on the side of the rotor chamber 15 with respect to the first gas seal 40A. The second gas seal 51 does not have the same members as the packing case 41 described in the first embodiment, and has a seal ring 52 and a resilient body 53 in the casing body 12 (the casing) as described later. The resilient body 53 has the same function as the resilient body 43 described in the first embodiment. The oil seal 31 and the first gas seal 40A are coupled and integrated by the fit configuration described in the first embodiment. The second gas seal 51 has the seal ring 52 and the resilient body 53 in the casing body (the casing) 12 that is not affected by warp of the rotor shaft 21. The second gas seal Si is provided at the position closest to the rotor chamber 15 that is most unlikely to be affected by warp of the rotor shaft 21 in the discharge side shaft seal device 40. The first gas seal 40A and the second gas seal 51 are not required to be integrated by the fit configuration.

At the end of the shaft seal space 10 on the side of the rotor chamber 15 in the casing body 12 (the casing), a tubular space is disposed. The tubular space has an inside diameter smaller than the gas seal 40A. On the side face of the casing body 12 (the casing) formed in the tubular space on the side of the rotor chamber 15, a support face 12a is formed. The support face 12a extends perpendicularly to the axial direction of the rotor shaft 21. In addition, on the side of the discharge side bearing 22 in the tubular space, a seal face 49b of the projection 49 in the packing case 41 is disposed. That is, both ends of the gas seal accommodation space 58 in the axial direction are defined by the support face 12a of the casing body 12 and the seal face 49b of the projection 49 in the packing case 41. The seal ring 52 and the wave spring 53 (the resilient body) are sandwiched between the seal face 49b and the support face 12a.

The seal ring 52 is the same as the seal ring 42 described in the first embodiment. The wave spring 53 (the resilient body) is the same as the wave spring 43 (the resilient body) described in the first embodiment. It is thus possible to reduce the cost by sharing the components. In the gas seal accommodation space 58, the seal ring 52 is pressed toward the projection 49 (the seal face 49) of the packing case 41 and is resiliently supported by the resilient force of the wave spring 53.

The seal ring 52 can move in the radial direction along the seal face 49b. Even if the rotor shaft 21 warps, the seal ring 52 follows the rotor shaft 21 to move in the radial direction. Thus, since the discharge side shaft seal device 40 has the second gas seal 51 in addition to the first gas seal 40A described in the first embodiment, the shaft sealing performance of the discharge side shaft seal device 40 can be improved.

A third embodiment of the present invention will be described in detail with reference to FIG. 4. The components of the third embodiment having the same function as the components of the second embodiment are indicated by the same reference numerals, and the overlapped description is omitted.

The discharge side shaft seal device 40 has a third gas seal 40B in addition to the first gas seal 40A and the second gas seal 51. The third gas seal 40B is disposed so as to be sandwiched between the first gas seal 40A and the second gas seal 51 in the axial direction of the discharge side shaft seal space 10. The third gas seal 40B is configured by the same members as the first gas seal 40A described in the first embodiment, and has a packing case 61, a seal ring 62, and a resilient body 63. The seal ring 62 is the same as the seal ring 42. The resilient body 63 is the same as the resilient body 43. It is thus possible to reduce the cost by sharing the components.

At the end of the packing case 61 on the side of the rotor chamber 15, a projection 69 is formed. The projection 69 projects radially inward. On the side face of the projection 69 on the side of the discharge side bearing 22, a support face 69a is formed. The support face 69a extends perpendicularly to the axial direction of the rotor shaft 21. Between the projection 49 of the packing case 41 and the projection 69 of the packing case 61, a gas seal accommodation space 68 is formed. In other words, the end of the packing case 61 on the side of the bearing (a fit concave end 64) and the end of the packing case 41 on the side of the rotor chamber 15 (a fit convex end 41a) are fitted and fixed to form the tubular gas seal accommodation space 68. The gas seal accommodation space 68 faces the outer peripheral face of the rotor shaft 21. Both ends of the gas seal accommodation space 68 in the axial direction are defined by the support face 69a of the projection 69 in the packing case 61 and the seal face 49b of the projection 49 in the packing case 41. The seal ring 62 and the wave spring 63 (the resilient body) are sandwiched between the seal face 49b and the support face 69a of the packing case 61.

In the gas seal accommodation space 68, the seal ring 62 is pressed toward the projection 49 (the seal face 49b) of the packing case 61 and resiliently supported by the resilient force of the wave spring 63. Thus, the seal ring 62 can move in the radial direction along the seal face 49b.

On the side face of the packing case 61 on the side of the rotor chamber 15, a seal face 69b is formed. The seal face 69b extends perpendicularly to the axial direction of the rotor shaft 21. Both ends of the gas seal accommodation space 58 in the axial direction are defined by the seal face 69b of the projection 69 in the packing case 61 and the support face 12a of the casing body 12 (the casing).

A seal face 57 of the seal ring 52 is pressed onto the seal face 69b of the projection 69 in the packing case 61 by the wave spring 53. Thus, the seal face 57 is sealed with respect to the seal face 69b.

The third gas seal 40B and the first gas seal 40A are coupled and integrated by the fit configuration described in the first embodiment. That is, at the end of the packing case 41 of the first gas seal 40A on the side of the rotor chamber 15, the fit convex end 41a is formed. The fit convex end 41a projects toward the rotor chamber 15. At the end of the packing case 61 on the side of the discharge side bearing 22, the fit concave end 64 is formed. The fit, concave end 64 fits to the fit convex end 41a of the packing case 41. For example, the packing case 61 of the third gas seal 40B is made of the same material as the packing case 41 of the first gas seal 40A (e.g., a stainless steel). The fit configuration of the fit convex end 41a and the fit concave end 64 is formed by interference fit or transition fit that gives slight interference to enable relatively easy disassembling.

In the fit configuration, a gap between the fit convex end 41a and the fit concave end 64 is very small and is substantially absent. It is thus possible to prevent a compressed gas from leaking from the gap. In the fit configuration illustrated in FIG. 4, the fit contact face of the fit convex end 41a directs radially outward, and the fit contact face of the fit concave end 64 directs radially inward. It is thus possible to prevent foreign substances from intruding into the third gas seal 40B in the fitting process.

Figure 4:
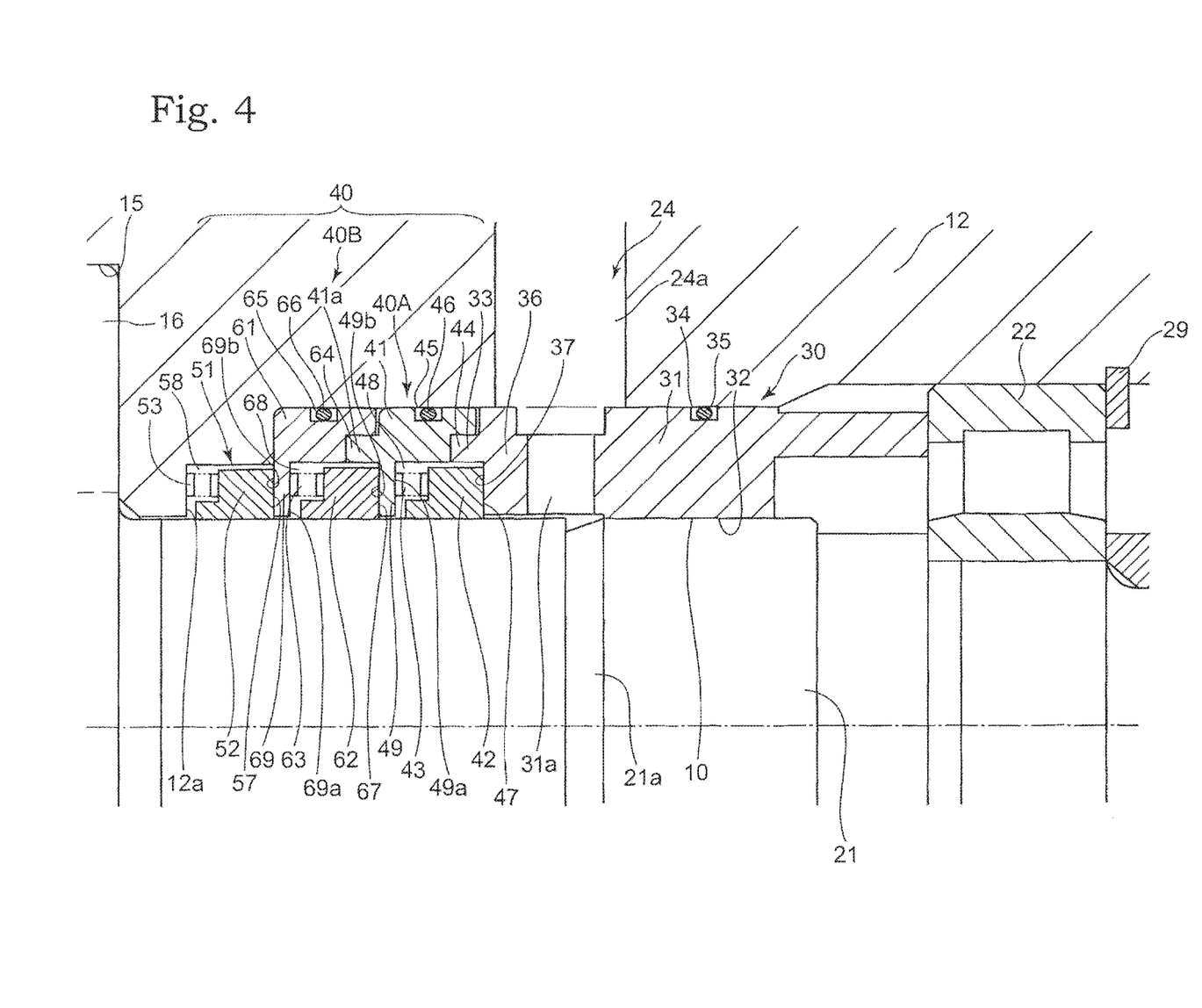
FIG. 4 is a partial cross-sectional view illustrating a third embodiment of the present invention.

In the third embodiment illustrated in FIG. 4, the oil seal 31, the first gas seal 40A, and the third gas seal 40B are coupled and integrated by the above-described fit configuration. Thus, the assemblability of the shaft seal devices 30, 40 into the discharge side shaft seal space 10 is good.

The seal ring 62 can move in the radial direction along the seal face 49b. Thus, even if the rotor shaft 21 warps, the seal ring 62 follows the rotor shaft 21 to move in the radial direction. This appropriately maintain the closely-contacted state between the seal face 49b of the packing case 41 and a seal face 67 of the seal ring 62 pressed toward the seal face 49b, without being affected by warp of the rotor shaft 21. Thus, since the discharge side shaft seal device 40 has the third gas seal 40B in addition to the first gas seal 40A and the second gas seal 51, the shaft sealing performance of the discharge side shaft seal device 40 can be improved. Even if the rotor shaft 21 warps, the shaft sealing performance of the discharge side shaft seal device 40 can be maintained.

Like the third embodiment, between the casing body 12 (the casing) and the discharge side shaft seal device 40, a clearance slightly larger than loose fit (JIS B 0401) is provided. Between the packing case 61 and the casing body 12 (the casing), an O-ring 66 is disposed. The dimension of the clearance is set in the range that can exhibit the sealing function of the O-ring 66. The O-ring 66 is disposed in a concave portion (annular groove) 65 formed along the peripheral direction on the outer peripheral face of the packing case 61. The O-ring 46 of the packing case 41 and the O-ring 66 of the packing case 61 can prevent useless gas flow, such as leakage of a compressed gas, between the casing body 12 and the discharge side shaft seal device 40.

A fourth embodiment of the present invention will be described in detail with reference to FIG. 5. The components of the fourth embodiment having the same function as the components of the third embodiment are indicated by the same reference numerals, and the overlapped description is omitted.

Figure 5:
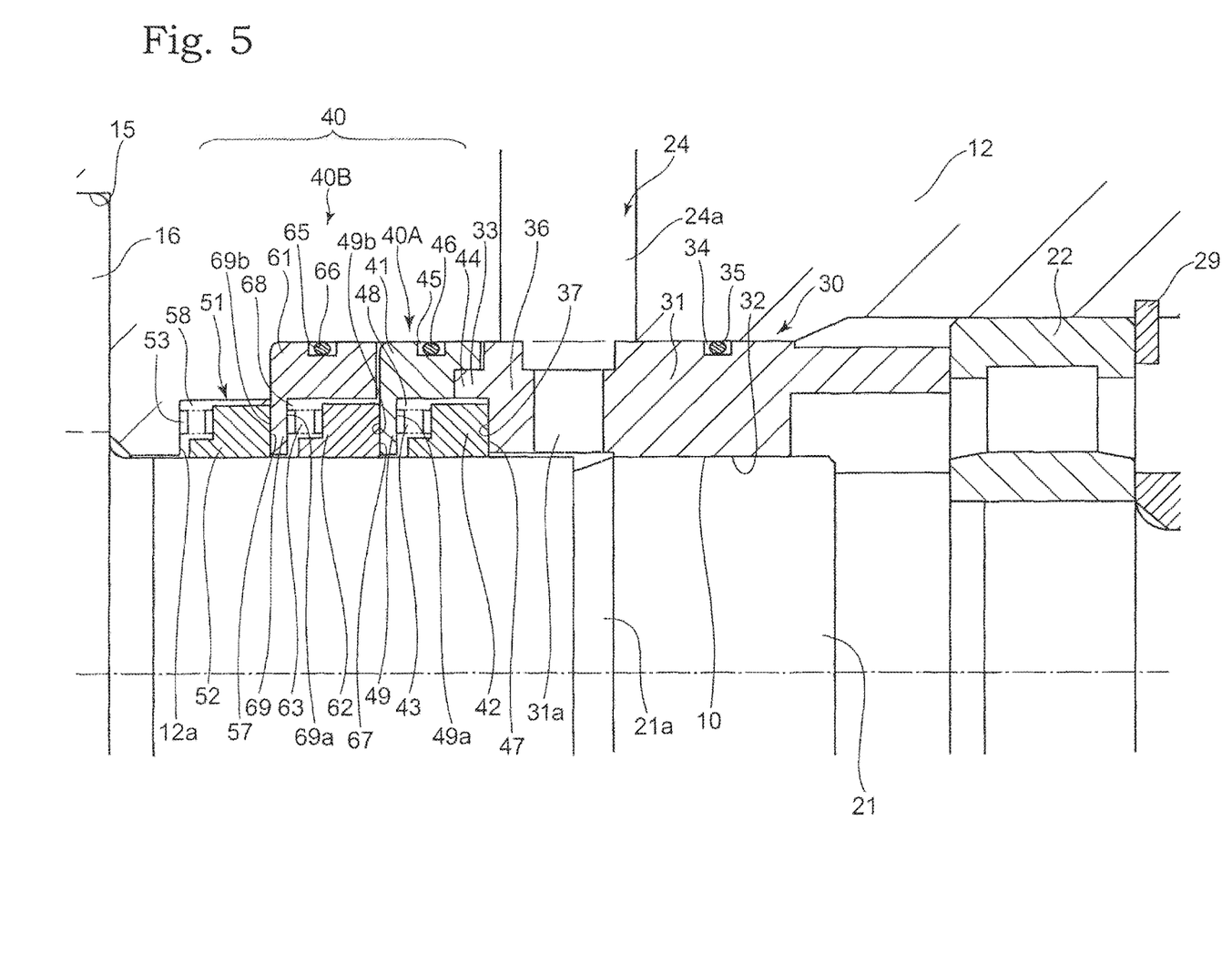
FIG. 5 is a partial cross-sectional view illustrating a fourth embodiment of the present invention.

The discharge side shaft seal device 40 illustrated in FIG. 5 is different from the third embodiment in that the first gas seal 40A and the third gas seal 40B are not integrated by the fit configuration.

The discharge side shaft seal device 40 does not have the fit configuration between the first gas seal 40A and the third gas seal 40B. Thus, the portion in which the end of the packing case 41 on the side of the rotor chamber 15 and the end of the packing case 61 on the side of the discharge side bearing 22 come into contact with each other is flat.

The discharge side shaft seal device 40 of the fourth embodiment does not have the sealing by the fit configuration including the fit convex end 41a and the fit concave end 64. However, in the discharge side shaft seal device 40 of the fourth embodiment, the third gas seal 40B is added to the discharge side shaft seal device 40 of the second embodiment. Thus, the discharge side shaft seal device 40 of the fourth embodiment has the shaft sealing performance equal to or more than the second embodiment and equal to or less than the third embodiment.

A fifth embodiment of the present invention will be described in detail with reference to FIG. 6. The components of the fifth embodiment having the same function as the components of the third embodiment are indicated by the same reference numerals, and the overlapped description is omitted.

Figure 6:
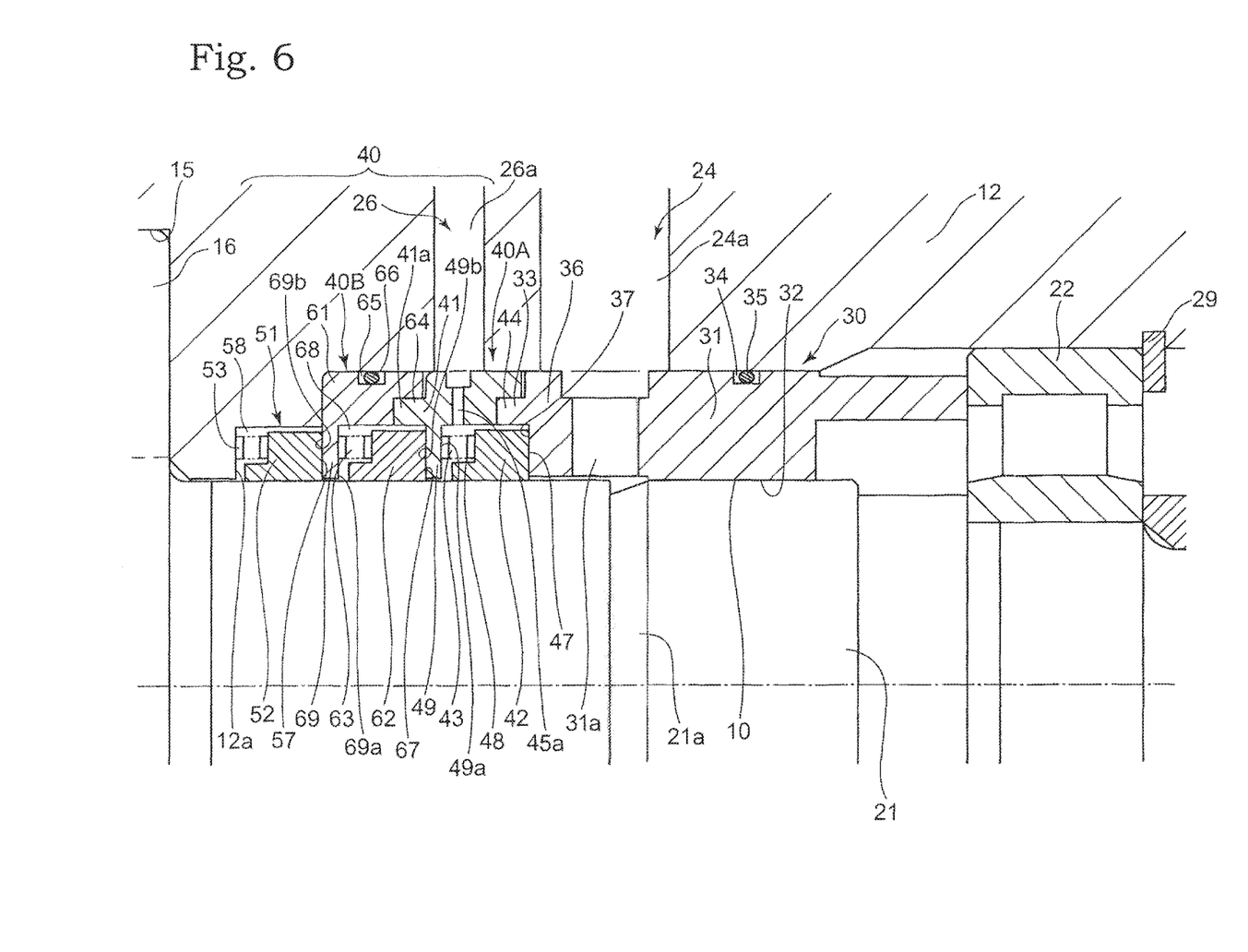
FIG. 6 is a partial cross-sectional view illustrating a fifth embodiment of the present invention.

The discharge side shaft seal device 40 illustrated in FIG. 6 is different from the third embodiment in that the packing case 41 of the first gas seal 40A has a packing case atmosphere communication hole 45a, and that the casing body 12 has a second atmosphere communication hole 26a.

The casing body 12 (the casing) has at least one second atmosphere communication hole 26a at the area closer to the first atmosphere opening passage 24 than the position at which the O-ring 66 is disposed. The second atmosphere communication hole 26a extends through the casing body 12 (the casing) to communicate the shaft seal space 10 and the outside (the atmosphere side) of the casing body 12 (the casing). The packing case 41 has a plurality of packing case atmosphere communication holes 45a that extend therethrough. The plurality of packing case atmosphere communication holes 45a communicate with the second atmosphere communication hole 26a through an annular groove provided on the outer periphery of the packing case 41 wider than the hole diameter thereof. The plurality of packing case atmosphere communication holes 45a are formed so as to communicate with the gas seal accommodation space 48 connected to the shaft seal space 10 on the inner peripheral side of the packing case 41. Thus, the second atmosphere communication hole 26a, the packing case atmosphere communication holes 45a, and the annular groove connecting both configure a second atmosphere opening passage 26.

The discharge side shaft seal device 30 has the first atmosphere opening passage 24 communicating with the shaft seal space 10 corresponding to the discharge side shaft seal device (the oil seal) 30 and the outside of the casing body 12 (the casing). The discharge side shaft seal device 40 has the second atmosphere opening passage 26 communicating the shaft seal space 10 (the gas seal accommodation space 48) corresponding to the discharge side shaft seal device (the gas seal) 40 and the outside of the casing body 12 (the casing). With this configuration, the shaft seal space 10 corresponding to the discharge side shaft seal device (the oil seal) 30 and the shaft seal space 10 corresponding to the discharge side shaft seal device (the gas seal) 40 are opened into the atmosphere. Thus, even if the rotor chamber 15 has a negative pressure therein during unload operation for a long time and thus, oil in the discharge side bearing 22 reaches the first atmosphere communication hole 24a, because of the second atmosphere communication hole 26a opened into the atmosphere at substantially the same pressure as the first atmosphere opening passage 24 and the seal ring 42, this prevents the oil from being suctioned into the rotor chamber 15.

A sixth embodiment of the present invention will be described in detail with reference to FIG. 7. The components of the sixth embodiment having the same function as the components of the third embodiment are indicated by the same reference numerals, and the overlapped description is omitted.

Figure 7:
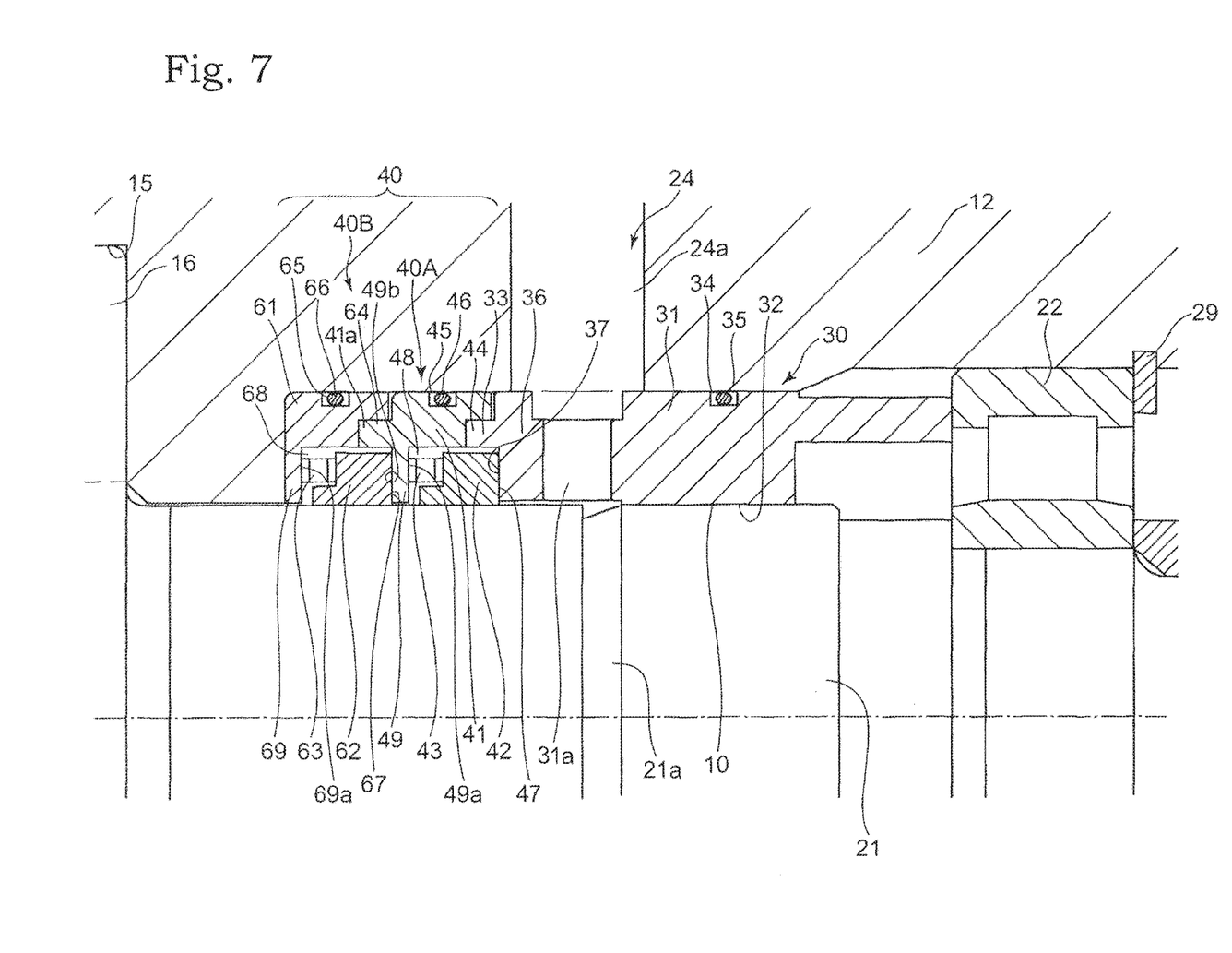
FIG. 7 is a partial cross-sectional view illustrating a sixth embodiment of the present invention.

The discharge side shaft seal device 40 illustrated in FIG. 7 is different from the third embodiment in that the discharge side shaft seal device 40 has the first gas seal 40A and the third gas seal 40B, but does not have the second gas seal 51.

The discharge side shaft seal device 40 of the sixth embodiment has the first gas seal 40A and the third gas seal 40B, and has the shaft sealing performance equal to or more than the second embodiment and equal to or less than the third embodiment. In the discharge side shaft seal space 10, the space for disposing the second gas seal 51 and the processing of the space are not required. With this configuration, the oil seal 31, the first gas seal 40A, and the third gas seal 40B, which are coupled and integrated by the fit configuration, are assembled into the discharge side shaft seal space 10. Thus, the assemblability of the shaft seal devices 30, 40 is good.

In the above embodiments, the discharge side shaft seal devices 30, 40 of the oil-free screw compressor 1 have been described, which is applicable to the suction side shaft seal devices 50, 60. In the gas seal configuration of the shaft seal device is not limited to the above embodiments, and the number of gas seals can be changed, as needed. Instead of the seal rings 42, 52, and 62, as the gas seal, a known seal member such as a labyrinth seal can be used. As the oil seal 31 of the discharge side shaft seal device 30, the labyrinth seal is illustrated, but a known seal member such as a screw visco seal can be used.

In the above embodiments, each of the oil seal 31 and the packing cases 41, 61 is configured by a single member, but may include two or more members divided in the axial direction as long as they are integrated into one configuration at assembling. In addition, in the non-contact oil seal 31, the oil seal portion 32 as the labyrinth seal or the screw visco seal may be separated from the main body holding the oil seal 31. The surface of the rotor shaft 21 may include a base material itself or various films provided on the surface of the base material, and may be formed of a sleeve fixed on the outer peripheral face side of the rotor shaft 21.

As is apparent from the above description, the present invention provides the oil-free screw compressor 1 that accommodates the pair of male and female screw rotors 16 intermeshing with each other in the rotor chamber 15 of the casing 12 in the compressor 1, supports each screw rotor 16 by the bearings 22, 23 through the rotor shaft 21, and has the shaft seal devices 30, 40 disposed in the shaft seal space 10 of the casing 12 formed between the rotor chamber 15 and the bearing 23 to seal the rotor shaft 21, in which the shaft seal devices 30, 40 include the oil seal 31 disposed on the side of the bearing 22, the packing case 41 disposed on the side of the rotor chamber 15, and the gas seal 42 sealing a gas, in which the end 44 of the packing case 41 on the side of the bearing 22 and the end 33 of the oil seal 31 on the side of the rotor chamber 15 are fitted and fixed by interference fit to form the gas seal accommodation space 48, the gas seal accommodation space 48 accommodating the gas seal 42.

With the above configuration, the packing case 41 of the shaft seal device 40 and the oil seal 31 of the shaft seal device 30 are fitted, fixed, and integrated by interference fit. This makes the assemblability of the shaft seal devices 30, 40 good. In addition, the gap by interference fit is very small. This can reduce leakage of a compressed gas from the fitted and fixed portion.

In addition to the above features, the present invention can have the following features.

That is, the oil seal is made of a material softer than the material of the packing case, and the end of the oil seal is the fit convex end, and the end of the packing case is the fit concave end. With the configuration, the workability of the oil seal requiring complicated processing is good. In addition, the fit contact face of the fit convex end of the oil seal made of a soft material directs radially outward. Thus, chips, which are caused in the oil seal in the fitting process, can be prevented from intruding into the gas seal accommodation space.

The gas seal has the seal ring provided about the axis of the rotor shaft, and the resilient body supporting the seal ring by a resilient force. With the configuration, even if the rotor shaft warps to be eccentric with respect to the gas seal, the seal ring follows the rotor shaft to move in the radial direction. Thus, the gap between the seal ring and the rotor shaft can be prevented from being widened to maintain the shaft sealing performance.

The shaft seal device has the O-ring of the packing case side disposed in the groove formed on the outer peripheral face of the packing case. With the configuration, this can prevent leakage of a compressed gas caused by the clearance between the packing case and the casing body.

The oil-free screw compressor may further have the first atmosphere communication hole extending through the casing and communicating the shaft seal space and the outside of the casing at the area closer to the bearing than the position at which the O-ring of the packing case side is disposed, and the oil seal atmosphere communication hole extending through the shaft seal device, communicating with the first atmosphere communication hole, and communicating with the position at which the gas seal accommodation space in the shaft seal space and the oil seal portion provided in the oil seal are connected. With the configuration, the shaft seal space corresponding to the discharge side shaft seal device (the oil seal) is opened into the atmosphere by the first atmosphere opening passage. Thus, even if the rotor chamber has a negative pressure therein during unload operation to exert a force suctioning oil in the discharge side bearing into the rotor chamber, the oil from the discharge side bearing can be prevented from being suctioned into the rotor chamber.

The oil-free screw compressor may further have the second atmosphere communication hole extending through the casing and communicating the shaft seal space and the outside of the casing at the area closer to the bearing than the position at which the O-ring of the packing case side is disposed, and the packing case atmosphere communication hole extending through the packing case, communicating with the second atmosphere communication hole, and communicating with the gas seal accommodation space. With the configuration, the shaft seal space corresponding to the discharge side shaft seal device (the oil seal) and the shaft seal space corresponding to the discharge side shaft seal device (the gas seal) are opened into the atmosphere. Thus, even if the rotor chamber has a negative pressure therein during unload operation for a long time so that oil from the discharge side bearing reaches the first atmosphere communication hole, the second atmosphere communication hole opened into the atmosphere at substantially the same pressure as the first atmosphere opening passage and the seal ring can prevent the oil in the discharge side bearing from being suctioned into the rotor chamber.

The shaft seal device has the O-ring of the oil seal side disposed in the groove formed on the outer peripheral face of the oil seal at the area closer to the bearing than the oil seal atmosphere communication hole. With the configuration, leakage of oil caused by the clearance between the oil seal and the casing can be prevented.

The shaft seal device has another gas seal at the area closer to the rotor chamber than the gas seal accommodated in the gas seal accommodation space. With the configuration, the shaft seal device has another gas seal to reduce leakage of a compressed gas.

The invention claimed is:

1. An oil-free screw compressor, comprising:
   a pair of male and female screw rotors intermeshing with each other in a rotor chamber of a casing,
   bearings that support one of the screw rotors through a rotor shaft, and
   shaft seal devices disposed in a shaft seal space of the casing formed between the rotor chamber and the bearings to seal the rotor shaft,
   wherein
   at least one of the shaft seal devices includes:
      an oil seal;
      a packing case disposed on a rotor chamber side opposite to the oil seal; and
      a seal ring sealing a gas, and
      an end of the packing case is a fit concave end and an end of the oil seal on the rotor chamber side is a fit convex end so that the end of the packing case and the end of the oil seal are fitted and fixed by interference fit to form a seal ring accommodation space, which accommodates the seal ring.

2. The oil-free screw compressor according to claim 1, wherein the oil seal is made of a material softer than a material of the packing case.

3. The oil-free screw compressor according to claim 1, wherein
   the seal ring is provided about an axis of the rotor shaft, and
   a resilient body supports the seal ring by a resilient force.

4. The oil-free screw compressor according to claim 1, wherein the shaft seal devices have an O-ring on a packing case side disposed in a groove formed on an outer peripheral face of the packing case.

5. The oil-free screw compressor according to claim 4, further comprising:
   a first atmosphere communication hole extending through the casing and communicating the shaft seal space and an outside of the casing at an area closer to an opposite side to the rotor chamber than the groove at which the O-ring on the packing case side is disposed; and
   an oil seal atmosphere communication hole extending through the shaft seal devices, communicating with the first atmosphere communication hole, and communicating with a position at which the seal ring accommodation space in the shaft seal space and an oil seal portion provided in the oil seal are connected.

6. The oil-free screw compressor according to claim 5, further comprising:
   a second atmosphere communication hole extending through the casing and communicating the shaft seal space and the outside of the casing at an area closer to the opposite side to the rotor chamber than the groove at which the O-ring on the packing case side is disposed; and
   a packing case atmosphere communication hole extending through the packing case, communicating with the second atmosphere communication hole, and communicating with the seal ring accommodation space.

7. The oil-free screw compressor according to claim 5, wherein the shaft seal devices have an O-ring on an oil seal side disposed in a groove formed on an outer peripheral face of the oil seal at an area closer to the opposite side to the rotor chamber than the oil seal atmosphere communication hole.

8. The oil-free screw compressor according to claim 1, wherein the shaft seal devices have another seal ring at an area closer to the rotor chamber than the seal ring accommodated in the seal ring accommodation space.

9. An oil-free screw compressor, comprising:
   a pair of male and female screw rotors intermeshing with each other in a rotor chamber of a casing,
   bearings that support one of the screw rotors through a rotor shaft, and
   shaft seal devices disposed in a shaft seal space of the casing formed between the rotor chamber and the bearings to seal the rotor shaft,
   wherein
   at least one of the shaft seal devices includes:
      an oil seal;
      a packing case disposed on a rotor chamber side opposite to the oil seal; and
      a seal ring sealing a gas, and
      an end of the packing case is a fit convex end and an end of the oil seal on the rotor chamber side is a fit concave end so that the end of the packing case and the end of the oil seal are fitted and fixed by interference fit to form a seal ring accommodation space, which accommodates the seal ring.

* * * * *